No. 893,094. PATENTED JULY 14, 1908.
T. OLSEN.
SAW TOOL.
APPLICATION FILED AUG. 26, 1907.
2 SHEETS—SHEET 1.
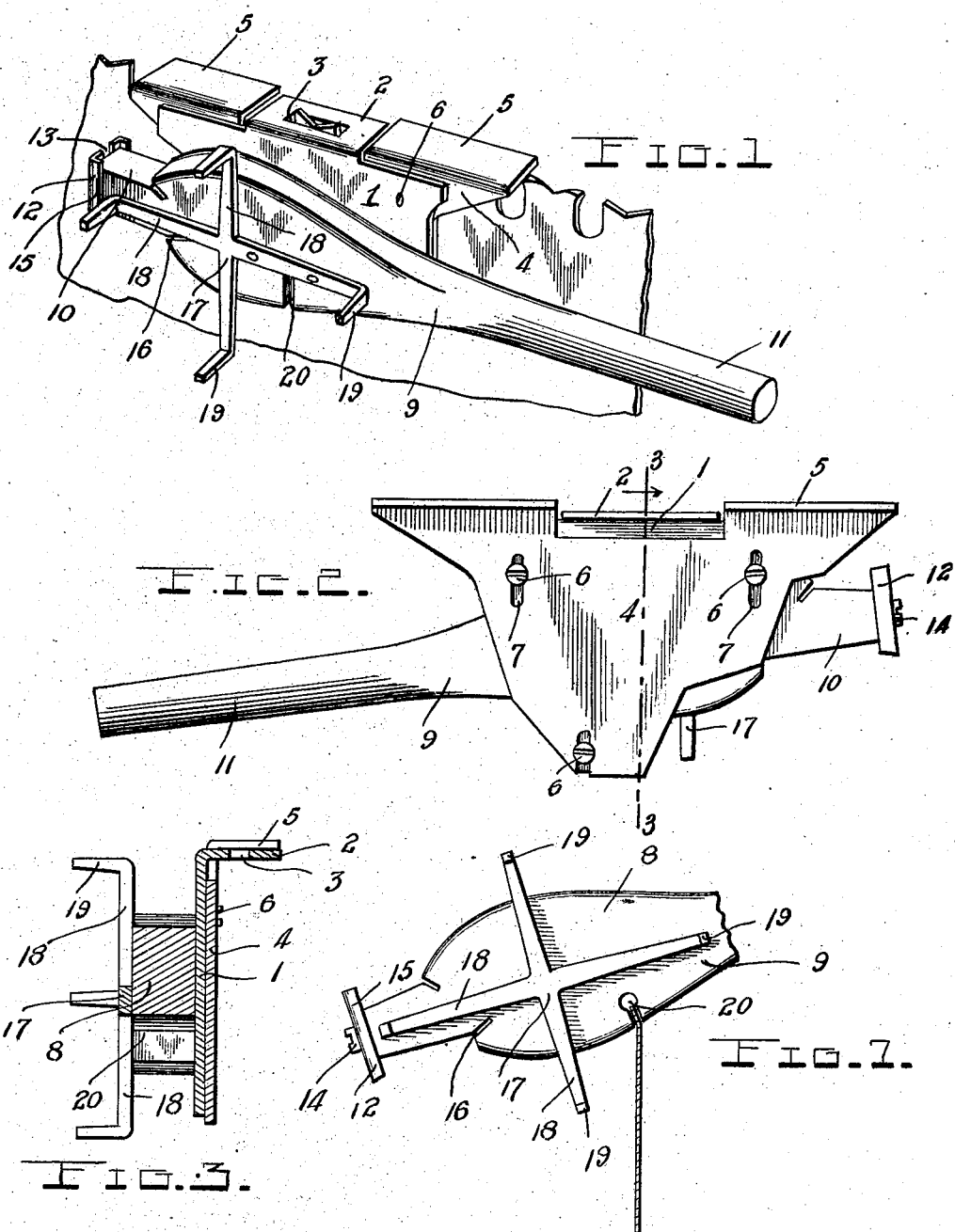
Witnesses
Chas. L. Griesbauer.
C. H. Griesbauer.
Inventor
Torbjorn Olsen.
by H. B. Willson & Co.
Attorneys

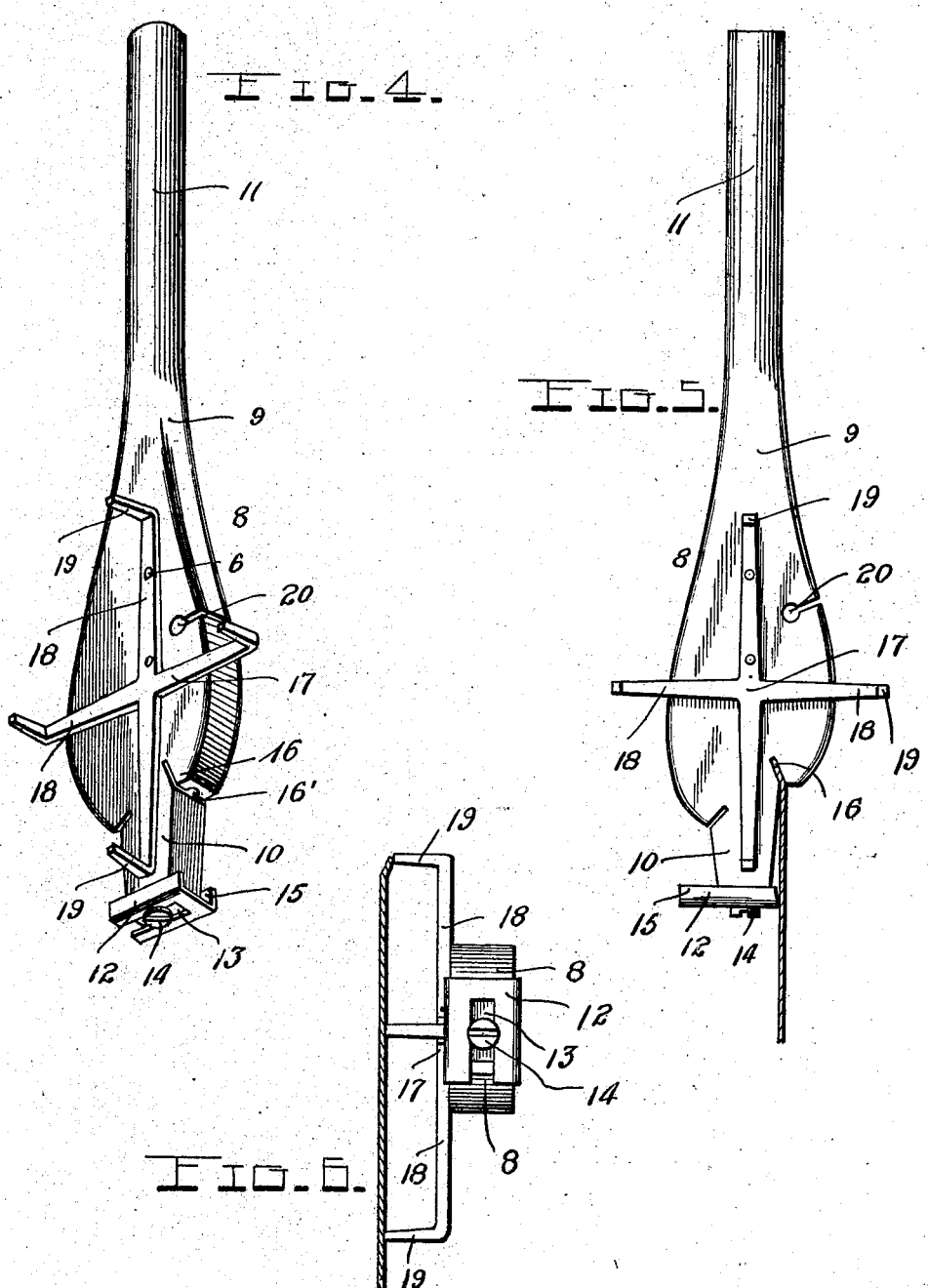

UNITED STATES PATENT OFFICE.

TORBJORN OLSEN, OF MANISTEE, MICHIGAN.

SAW-TOOL.

No. 893,094.　　　　Specification of Letters Patent.　　　Patented July 14, 1908.

Application filed August 26, 1907. Serial No. 390,177.

*To all whom it may concern:*

Be it known that I, TORBJORN OLSEN, a citizen of the United States, residing at Manistee, in the county of Manistee and State of Michigan, have invented certain new and useful Improvements in Saw-Tools; and I do declare the following to be a full, clear, and exact description of the invention, such as will enable others skilled in the art to which it appertains to make and use the same.

This invention has relation to new and useful improvements in saw tools, and has for its object to provide a simple and economical device of this character for operating on the teeth of saws, and particularly cross cut saws, whereby the teeth may be set, swaged and gaged, or the accuracy and uniformity of the set ascertained in a convenient and expeditious manner, and with a minimum of labor.

With the foregoing and other objects in view, the invention consists of certain novel features of construction, combination and arrangement of parts, as will be more fully described and particularly pointed out in the appended claims.

In the accompanying drawings,—Figure 1 is a perspective view of a saw tool constructed in accordance with the invention, showing a portion of a cross cut saw in position when cutting off the ends of a drag or cleaner tooth; Fig. 2 is a side elevation; Fig. 3 is a cross sectional view on the line 3—3 of Fig. 2, looking in the direction indicated by the arrows; Fig. 4 is a perspective view of the body or shank of the tool; Fig. 5 is a side elevation of Fig. 4 showing the manner of setting the saw teeth; Fig. 6 is a view showing the manner of using the tool when gaging the set of the teeth; and Fig. 7 is a fragmentary view indicating the tool as in use for straightening a tooth.

In the embodiment illustrated and in accordance with the invention, an inner plate 1, having a central inwardly extending flange 2 at its upper edge with a central longitudinal slot 3 to receive either one of the drag or cleaner teeth of the saw is provided. A gage plate 4 having outwardly extending flanges 5, at its upper edge spaced a suitable distance apart to leave a space to receive the flange of the inner plate, is adjustably secured to the outer face of the inner plate by screws 6 working in corresponding vertical slots 7 in the body of the gage plate and screwing in corresponding screw threaded openings in the inner plate.

In practice the gage plate may be adjusted up or down, according to the amount desired to be cut off of the drag or cleaner teeth. The inner plate is screwed at its inner face in any suitable manner to one face of the intermediate or enlarged portion 8 of a body or shank 9, having a reduced portion 10 at one end and a handle 11 at its opposite end. A vertically disposed set plate 12, having a central longitudinal slot or opening 13, extending from one end to within a suitable distance of its opposite end, is adjustably secured to the end of the reduced end portion of said body or shank by a screw 14, working through said slot, and screwing in said end portion. Said set plate is also provided at its side edges with inwardly extending guide flanges 15, which work against opposite sides or faces of said body and prevent lateral displacement of said plate. The lower ends of said flanges are inclined upward at a suitable angle, the purpose of which will be shown. One of the functions of said plate is to regulate the degree of set for the teeth. Extending into the end of the enlarged portion at its junction with the reduced portion is a slot 16 which is arranged at an inward incline with relation to the axis of the tool, and the outer wall of this slot is provided with a channel 16' to receive the point of a tooth or to fit over the same, so that when the saw tooth is inserted in the slot the tool will not touch the sharp point of the tooth and thus dull or break it. After a tooth has been properly set by administering a slight tap with a hammer or other device on the tool any timber bind will be removed and the tooth may be easily removed from the slot. On the opposite edge of the body or shank, at the junction of the reduced end portion with the intermediate portion is a pointed swaging tooth, and the lower end of the plate 12 will form an abutment against which the side of the saw tooth may be placed, and the degree of lateral set to the points of the drag teeth regulated or made even.

I find that by setting the points of the drag teeth laterally in opposite directions the shavings are cut out of the kerf instead of drawn out, thus permitting the saw to work easily and faster.

To determine whether or not the several teeth of the saw have been equally set, a gage 17 is secured to the face or side of the tool body opposite said gage plate, preferably at the intermediate or enlarged portion thereof. This gage comprises four radially projecting arms 18, spaced equi-distances apart, two of said arms being disposed longitudinally relatively to the plane of the tool body and two at right angles thereto, said last mentioned arms being preferably somewhat shorter than the first mentioned arms. The outer ends of said arms are bent at right angles to form inwardly extending fingers or portions 19, three of which are of equal lengths, and one of somewhat shorter length. In practice, to ascertain whether or not the several teeth of the saw have been evenly set, the three inwardly extending fingers of equal length of the gage, are placed against the saw blade and the other or shorter finger against a tooth.

At one side of the enlarged or intermediate portion of the tool body or shank is a slot 20, in which a tooth may be placed when it is desired to reduce its set or straighten it, the handle of the tool serving at this time as a lever.

The tooth 16 forms an abutment for the end of a drag tooth for swaging, which is accomplished by inserting the tooth through the slot of the set plate and administering a sharp tap on the other end of the tool.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having described my invention, what I claim as new and desire to secure by Letters-Patent, is:—

In a saw tool, the combination with a body having an intermediate enlarged portion and a slot formed in the end of said portion, of a reduced portion extending from the enlarged portion and a set plate mounted to slide on the outer end of said reduced portion, said plate comprising a body portion formed with a central longitudinal slot from one end to a point adjacent to its opposite end, and being bent inwardly at opposite side edges to form inwardly extending guide flanges adapted to engage opposite sides of said reduced portion.

In testimony whereof I have hereunto set my hand in presence of two subscribing witnesses.

TORBJORN OLSEN.

Witnesses:
ALBERT ERICKSON,
VICTOR E. SWANSON.